Aug. 16, 1966    P. D. PAGE    3,267,362
ELECTRODE CARRIER ASSEMBLY
Filed April 18, 1962    2 Sheets-Sheet 1
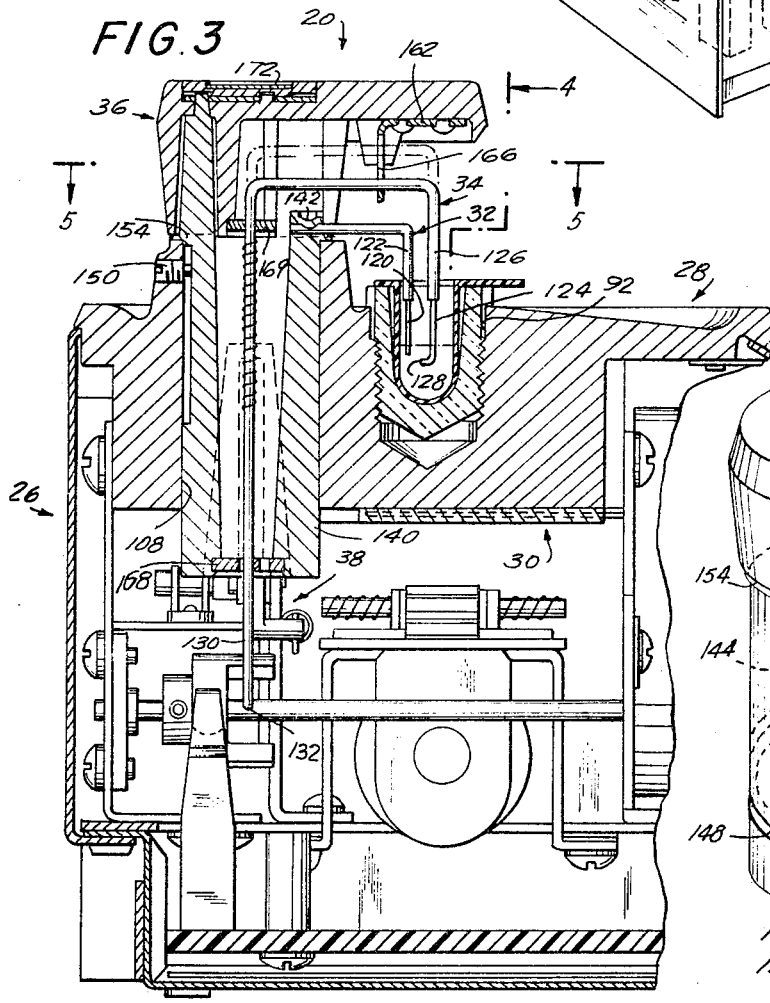
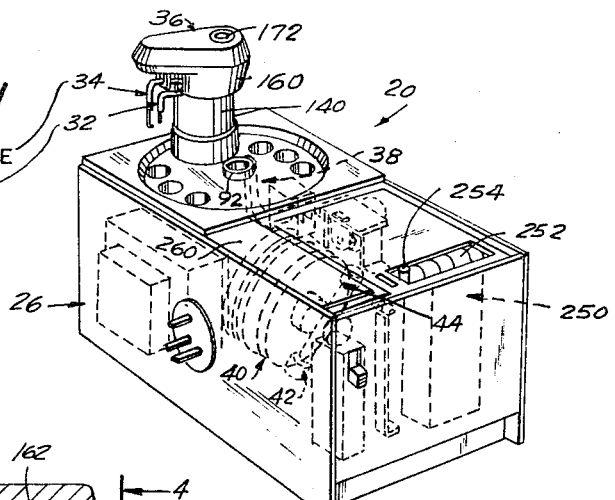
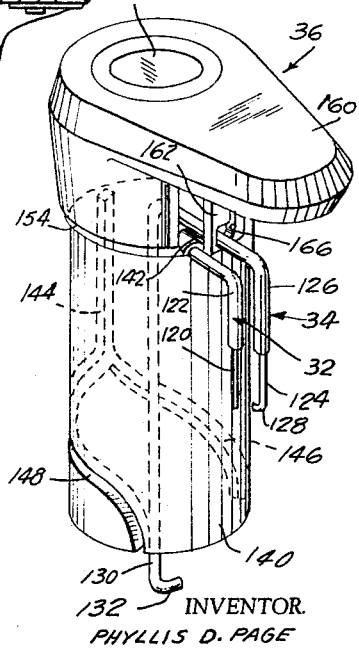
INVENTOR.
PHYLLIS D. PAGE
BY
Kane, Dalsimer and Kane
ATTORNEYS

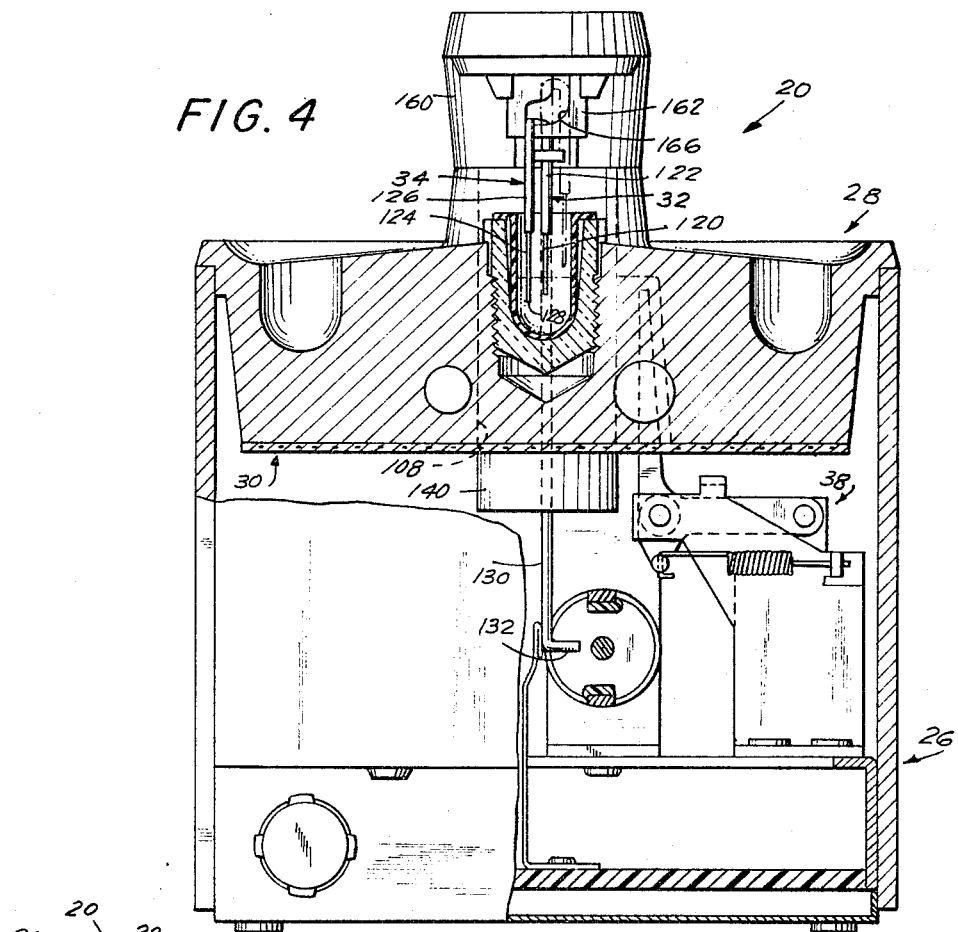
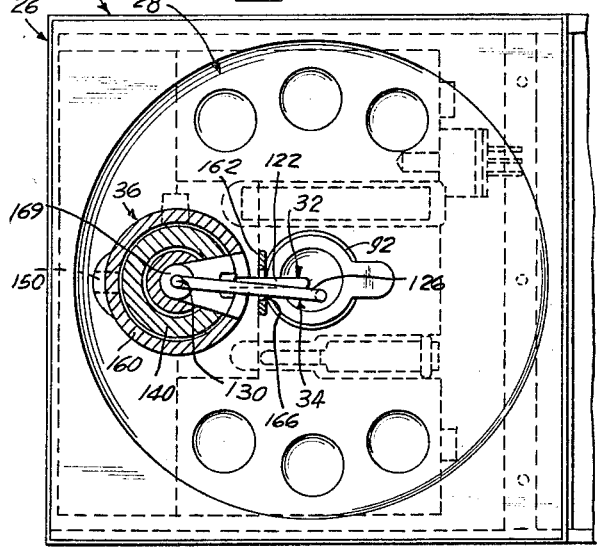

United States Patent Office 3,267,362
Patented August 16, 1966

3,267,362
ELECTRODE CARRIER ASSEMBLY
Phyllis D. Page, Aldan, Pa., assignor to Becton, Dickinson and Company, Rutherford, N.J., a corporation of New Jersey
Filed Apr. 18, 1962, Ser. No. 188,354
2 Claims. (Cl. 324—30)

The present invention relates to an electrode carrier for use in a system for determining certain characteristics of a liquid material and, more particularly, to an electrode carrier for use in a system for measuring prothrombin times and the coagulation properties of blood.

It should be understood initialy that this invention has wider applications to the field of liquid resistivity and conductivity determinations of the presence of certain bodies in liquids, and fibrillation per se. As an illustrative embodiment, this disclosure will be devoted primarily to hemostosis, and has particular utility in the apparatus constituting the subject matter of companion patent aplication filed on even date herewith entitled "Coagulation Timer" under S.N. 188,934 filed in the name of Phyllis D. Page and Bruce B. Young and having a common assignee.

Thus, the present invention is directed to an electrode carrier assembly for an electro-mechanical instrument adapted to measure the coagulation properties of plasma in diagnostic and therapeutic control. The instrument to which this invention pertains is particularly applicable to prothrombin time determinations.

Briefly stated, this instrument is a timer incorporated into a casing of relatively reduced size, whereby the overall unit is readily portable, light-weight, compact and miniature, yet effectively operated with efficiency. A heater block is mounted by the casing and may be formed with a number of wells for receiving test tubes containing either patient's or control plasma or selected chemical reagents for carrying out the coagulation process. The block additionally includes a reaction well which receives a test tube wherein the particular plasma is reacted with the selected reagent.

A binary heating system that is thermostatically controlled serves to heat the block to the desired temperature and maintain it at this point within preset limits. In prothrombin time determinations the temperature ordinarily selected is that of the normal body temperature, notably 37° C.

A pair of electrodes are suspended from the probe carrier assembly of this invention, which is adapted to assume a rest position at which the electrodes are retracted laterally to one side of the reaction well, and an immersed position. In this position the electrodes are in the specimen of liquid to be tested and measured in the reaction well. One of the electrodes is adapted to be stationary with respect to the probe arm of this assembly whereas the other electrode is movable relative thereto. In this connection the movable probe is adapted to define a certain path of travel into and out of the specimen of liquid within the reaction well to facilitate accurate sensing and detection. Projecting surfaces of the heater block cooperate with a spiral-shaped groove or raceway in order that the probes may be directed from their rest position into the reaction well containing the specimen to be tested.

A probe carrier release mechanism serves to releasably lock or latch the probe arm in its rest position until such time as it is desirable to initiate the test cycle. This release mechanism incorporates a time delay in order to permit the removal of all possible obstacles from the path of fall or descent of the probe arm and its suspended electrodes following the actuation of the timer. Under these circumstances the probe carrier will descend after the expiration of this predetermined time interval.

A motor having the usual output shaft is mounted within the timer casing and serves to move the movable electrode into and out of the specimen being tested, so that it is sufficiently agitated and the end point for the property being measured may be readily detected. In the case of time measurements of fibrillation initiation in a liquid specimen having such properties, the movable electrode will, in time, lift a fiber or network of fibers out of the liquid specimen. When this occurs, the desired end point of the test operation has been reached. In driving the movable electrode over the prescribed path, the output shaft of the motor mounts a stepped cam bearing a prescribed configuration. The movable probe is adapted to engage this cam and accordingly be subjected to a predetermined number of cycles into and out of the liquid specimen per revolution of the output shaft.

A timing means for registering the end point of the measurement being taken is also incorporated in the casing. This timing means may assume the form of a digital readout which may be pulsed synchronously with the rotation of the output shaft of the motor. When the particular measurement being made has been completed, this timing means will cease operation to register the desired times.

A timer bar assembly serves to initiate the operation of the timer. A cut-out means is also provided whereby the operation of the timer and the movement of the movable probe is stopped by deactivating the motor immediately upon reaching the end point of the measurement being made. If the initiation of fibrillation is being conducted as the measurement and the liquid specimen being tested is blood or its plasma mixed with a reagent, the cut-out means acts upon the sensing and lifting of fibrin from the liquid specimen or sample by the movable electrode. In this connection an electrical potential is applied across the electrodes. In the event fibrin of the blood sample is lifted out of the mixture by the movable probe, an electrical current path is thusly provided between the electrodes through the fibrin and blood sample. When this current path is provided, an electrical circuit is shorted resulting in the de-energization of the motor and consequently the cessation of operation of the digital read-out and movement of the movable electrode. In prothrombin time determinations, the measurement is thus made and the time registered by the digital read-out is read and recorded. Under such circumstances it will be possible to determine the proper diagnostic and therapeutic control.

Other objects and advantages will become apparent from the following detailed description which is to be taken in conjunction with the accompanying drawings illustrating a somewhat preferred embodiment of the invention and in which:

FIG. 1 is a perspective view of a coagulation timer incorporating the teachings of the present invention;

FIG. 2 is an enlarged perspective view of the electrode carrier assembly of the present invention;

FIG. 3 is a fragmentary elevational view partly in section showing this electrode carrier assembly associated with the timer;

FIG. 4 is a partial sectional view taken along the line 4—4 of FIG. 3; and

FIG. 5 is a fragmentary sectional view taken along the line 5—5 of FIG. 3.

In the drawings an electro-mechanical instrument or apparatus 20 automatically measures the coagulation properties of plasma in diagnostic and therapeutic control. This instrument is based on the time-tested, manual technique adapting the basic action of a trained technician manipulating a wire loop for sensing the initial clot formation. The coagulation timer 20 is designed to form part of a modular system for investigating and measuring the coagulation properties of blood. Thus the timer 20 may be a modular unit of a system which may include a centrifuge utilized for purposes of separating the constituents of whole blood into the component parts. A heater unit may form part of this modular system for purposes of heating blood plasma and selected chemical reagents to the desired operating temperatures.

The timer 20 (see FIG. 1) will include a casing 26 which mounts, among other units, a heating block 28 for receiving, as well as transferring, heat to the individual liquids and their reaction mixtures to be described in detail shortly. A binary thermostatically controlled heating means 30 is associated with the block 28 for purposes of raising it to the selected standard operating temperature and maintaining it at this point with very narrow limits. A pair of electrodes 32 and 34 are suspended from a probe carrier assembly 36 such that in one position the electrodes are at rest away from the reaction mixture to be tested, and in a second position at which the electrodes are operable to detect the initiation of fibrillation. As will be explained, the electrode 32 is stationary whereas electrode 34 is adapted to be movable into and out of the reaction mixture. A carrier release mechanism 38 serves to releasably lock or latch the probe carrier assembly 36 in its rest position. When this mechanism is actuated, it will release the probe carrier assembly 36 so that the probes 32 and 34 will be in an operable position immersed in the reaction mixture. A drive assembly 40 is interiorly of the casing 26 and performs a number of functions, one of which being to raise and lower the movable probe 34 out of and then into the reaction mixture. Another purpose of the drive means 40 is to actuate a timing mechanism 42 which registers and records the prothrombin times. The starting of the timing means and, for that matter, the initiation of operation of the timer 20, aside from the heating means 30, is regulated by a timer bar assembly 44. In this connection the drive means 40 will be actuated to, in turn, set into operation the timing means 42 and the movement of the movable probe 34 following the descent of the probe carrier assembly 36 after a predetermined time interval as governed by the release mechanism 38. When fibrin is sensed and detected by the movable probe, as will be explored in detail shortly, the drive means 40 and, consequently, the timer 42 and movable probe 34 will cease operation. The end point of the prothrombin time determination has accordingly been reached. This prothrombin time is then read and recorded.

Referring now to the probe carrier assembly of this invention, it will be realized that the electrodes 32 and 34 are suspended therefrom.

*Electrodes*

The electrodes 32 and 34, during the operation of the timer 20, are supplied with an electrical potential when the movable electrode 34 is raised above the surface of the liquid in the reaction well 92. When fibrillation or, more particularly, thrombosis occurs the fibrin will be sensed and lifted out of the blood specimen by the movable probe 34. At such time, a current path is provided between the electrodes thereby determining the end point of the test. The stationary electrode 32 includes (see FIG. 2) a wire tip 120 extending from a tube 122 having a 90° bend therein. The other end of the tube is secured as by peening to the carrier assembly 36. The movable electrode similarly includes a wire tip 124 extending from a tube 126. The free end of the wire 124 of this electrode is bent at a predetermined space distance from the end to provide a transversely extending lifting arm 128. This arm senses and lifts the fibrin network from the blood sample in the contemplated prothrombin determinations. The tube 126 includes a double 90° bend whereby an elongated arm 130 is formed which terminates in a cam follower tip 132, the purpose of which will beccome apparent shortly.

Electrically, the stationary probe 32 is earthed or connected to ground whereas the movable electrode 34 is coupled directly to the conductivity detection circuitry in a manner to be described.

The stroke of the movable electrode 34 will be discussed at this time because of its relative importance. First of all, it should be established and be made clear that the space between electrodes is not critical.

The dimensional parameters of the wire 124 and projecting arm 128 are not necessarily critical, the surface area of the wire further being of no consequence. It is desired, however, that the time tested manual wire loop technique wherein a trained technician would immerse and then retract the loop from the blood specimen until such time as network of fibrin is visibly detected be duplicated. To this end the movable probe 34 completes two cycles per second. A cycle being one complete sweep into, out of and then back again into the blood specimen.

If the extent to which the probe travels above the surface of the liquid is large, the end point of the test is extended or prolonged. If there be too small an immersion of the movable probe a good cross-section of the sample being tested is not experienced. If the depth of immersion is too great, fibers may be pulled off as the probe moves through the specimen. It has been found that satisfactory results are obtainable when the movable probe has an effective stroke of 0.250 inch±.008 inch read. The depth of immersion being 0.200 inch±.005 inch and the height to which the movable probe is lifted 0.050 inch±.003 inch.

If the movable probe 34 traverses a cycle too slowly the critical time and end point may be missed. Naturally, if it travels too fast the fiber and fiber network may be sheared thereby giving improper end points.

*Probe carrier assembly*

The probe carrier assembly 36 (see FIGS. 2, 3 and 4) serves to properly place the electrodes 32 and 34 in the reaction well 92 when the timer is set in operation. When in non-use or prior to initiation of operation or after an end point has been reached, the probe carrier assumes a rest position at which the electrodes are directed upwardly and to the side away from the reaction well. The probe carrier assembly comprises the tubular carrier 140 which receives, interiorly thereof and in a coaxial relationship, the arm 130 of the movable probe 34. The carrier 140 is peened as at 142 for purposes of anchoring thereto the stationary electrode 32. This carrier 140 is slidably disposed in the bore 108 of the heater block 28 as previously explained. At the rear of the carrier 140 is formed a raceway or groove network which includes the longitudinally extending groove sector 144 which extends into bifurcated grooves 146 and 148. A set screw 150 extending from the heating block 28 into this groove network serves to direct the movement of the probe carrier assembly 36 from a raised position to a lowered position at which the probes are in the reaction well and vice versa. The bifurcated groove system permits the raising of the carrier assembly 36 and shifting to either side of the reaction well as desired. Notwithstanding the side to which the carrier assembly is laterally shifted, upon the release of the carrier assembly by the carrier release mechanism 38, the electrodes 32 and 34 will eventually fall into the reaction well 92. The radial flange 154 of the carrier 140 engages the heater block 28 to stop the downward descent of the carrier and probes 32 and 34.

A cap 160 fits neatly over the top of the carrier 140 and is secured thereto in any one of a number of ways, as for example, by peening studs extending upwardly from the carrier through openings in the cap as shown. A strap 162 is suspended from the cap 160 for supporting the movable probe 34 and guiding its sweep. In this connection, the strap 162 will be provided with a pattern opening 166 of such configuration that the traverse of the tube 126 therein will be translated into a corresponding movement of the arm 128. A washer 168 on the carrier 140 and washer 169 on the cap 160 serve to guide the arm 130 through its movements.

A name plate 172 may be secured in a suitably formed recess in the cap 160 if desired.

Electrode carrier release mechanism

The electrode carrier release mechanism 38 (see FIGS. 3, 4 and 5) serves a dual function. Firstly, while in a de-energized state, it is adapted to maintain the electrode carrier 36 in either of its two rest positions. Secondly, in an energized state, it will permit the electrode carrier 36 to descend. The interengagement of the slotted network of the carrier 140 and the set screw 150, will place the electrodes 32 and 34 in the reaction well 92. In accordance with one of the standardized techniques, as previously discussed, 0.2 ml. of reagent is contained in the tube. Then 0.1 ml. of either control or patient's plasma is inserted in the tube containing reagent. In order to enable the attendant or timer operator to remove instruments, fingers and the like from the path of travel of the eletcrode carrier 36 and electrodes 32 and 34, a time delay is incorporated into the carrier release mechanism 38 before the probes are permitted to descend.

Thus, it should be apparent that an effective electro-mechanical instrument is provided by this invention to measure the properties of liquids, detect certain of their constituents and determine their facility to undergo fibrillation. An important application is in the measurement of coagulation properties of plasma in diagnostic and therapeutic control.

Assuming that the probe carrier is in a rest position and the heating system, together with the plasma and reagent are at operating temperatures, aliquots of plasma are blown into the selected thromboplastin reagent in a tube in the reaction well 92. The timer bar 260 is immediately pressed to initiate the mechanical action. The probe carrier 36 automatically swings the probes 32 and 34 over the reaction well after the time delay dictated by the release mechanism 38. The movable electrode 34 alternately descends and lifts to seek and sense initial clot formation.

When the end point occurs, the moving electrode 34 and the timer means 250 stop. Prothrombin time, in seconds and tenths, is registered on the digital read-out 252. The read-out reset button 254 is pressed; the electrodes cleaned by wiping with ordinary tissue, and the probe carrier 36 repositioned at rest, in readiness for subsequent tests.

In view of the foregoing, the afore-noted objects and advantages are effectively attained. Although a single preferred embodiment of the invention has been disclosed herein, it should be understood that the invention is in no sense limited thereby, but is to be determined by the scope of the appended claims.

I claim

1. An electrode carrier for use in a system having a frame for determining the coagulation properties of blood comprising: a tubular body, and a pair of spaced electrodes supported by said body for immersion in a specimen of the liquid material, and said body having means for cooperating with the frame of the system for lowering both of said electrodes into said specimen to an electrode-immersed position from an electrode-elevated position, one of said electrodes adapted to be stationary in said specimen, support means for supporting said one of said electrodes in a stationary position with this stationary electrode being fixed relative to the body, the other of said electrodes adapted to be movable into and out of said specimen, mounting means for movably mounting said other of said electrodes, the body including a longitudinally extending bore, and the movable electrode being movable relative to the body and within said bore, the body including guide means for only guiding said movable electrode through a prescribed path, said guide means including a strap having a pattern opening through which said movable electrode projects and said opening determining the path said movable electrode follows through said specimen.

2. The invention in accordance with claim 1 wherein said means includes a raceway in said body for receiving a projection on the frame of said system for cooperating to permit the body to immerse said electrodes in said specimen and remove said electrodes therefrom to a position upwardly and then to the side of said receiving means.

References Cited by the Examiner

UNITED STATES PATENTS

| 2,770,531 | 11/1956 | Hawes et al. | 23—253 X |
| 2,931,977 | 4/1960 | Torstenson et al. | 324—65 |
| 3,020,748 | 2/1962 | Marshall et al. | 73—53 |

OTHER REFERENCES

Schnitger, German printed application No. 1,022,822, published Jan. 16, 1958.

WALTER L. CARLSON, *Primary Examiner.*

FREDERICK M. STRADER, *Examiner.*

C. F. ROBERTS, *Assistant Examiner.*